United States Patent
Costan et al.

(10) Patent No.: US 8,467,207 B2
(45) Date of Patent: Jun. 18, 2013

(54) SYSTEM FOR CONVERTING AT LEAST ONE ELECTRICAL INPUT DIRECT CURRENT INTO AN ELECTRICAL POLYPHASE OUTPUT ALTERNATING CURRENT

(75) Inventors: Valentin Costan, Montrouge (FR); Bernard Gollentz, Soultz (FR)

(73) Assignee: Converteam Technology Ltd., Rugby (GB)

( * ) Notice: Subject to any disclaimer, the term of this patent is extended or adjusted under 35 U.S.C. 154(b) by 838 days.

(21) Appl. No.: 12/647,290

(22) Filed: Dec. 24, 2009

(65) Prior Publication Data

US 2010/0165678 A1 Jul. 1, 2010

(30) Foreign Application Priority Data

Dec. 24, 2008 (FR) ...................................... 08 59062

(51) Int. Cl.
*H02M 7/538* (2007.01)
*H02M 7/5383* (2007.01)

(52) U.S. Cl.
USPC ................................ 363/71; 363/95; 363/131

(58) Field of Classification Search
USPC ...................... 363/71, 95, 123, 131
See application file for complete search history.

(56) References Cited

U.S. PATENT DOCUMENTS

| | | | | |
|---|---|---|---|---|
| 5,416,458 A | * | 5/1995 | Menke et al. | 336/12 |
| 5,555,494 A | * | 9/1996 | Morris | 363/17 |
| 6,169,677 B1 | | 1/2001 | Kitahata et al. | 363/71 |
| 2010/0084922 A1 | * | 4/2010 | Gollentz et al. | 307/78 |
| 2011/0204835 A1 | * | 8/2011 | Gollentz | 318/400.27 |
| 2012/0020129 A1 | * | 1/2012 | Alexander | 363/123 |

FOREIGN PATENT DOCUMENTS

| | | |
|---|---|---|
| DE | 38 26 524 | 3/1989 |
| JP | 10 0550 78 | 3/1989 |
| JP | 2008 178 180 | 7/2008 |
| KR | 2001 0083809 | 9/2001 |
| KR | 100 428 459 | 4/2004 |
| WO | WO 90/10339 | 9/1990 |

\* cited by examiner

*Primary Examiner* — Adolf Berhane
*Assistant Examiner* — Nusrat Quddus
(74) *Attorney, Agent, or Firm* — Davidson, Davidson & Kappel, LLC

(57) ABSTRACT

A system for converting at least one electrical input direct current into an electrical output alternating current comprising M phases and supplied to M output terminals includes N polyphase inverters, connected in parallel, each converting the input direct current into an intermediate alternating current comprising M phases and supplied to M intermediate terminals; N×M first electromagnetic coupling coils, each being connected to a respective intermediate terminal; N×M magnetic cores, each first coil being wound around a respective core.

This system comprises N×M second electromagnetic coupling coils, each being connected to a respective first coil and wound around a distinct core from that of the respective first coil. The first and second coils of a same core correspond to a single phase, and generate respective common mode fluxes of opposite directions. Each output terminal is connected to the M second coils of a single phase.

16 Claims, 5 Drawing Sheets

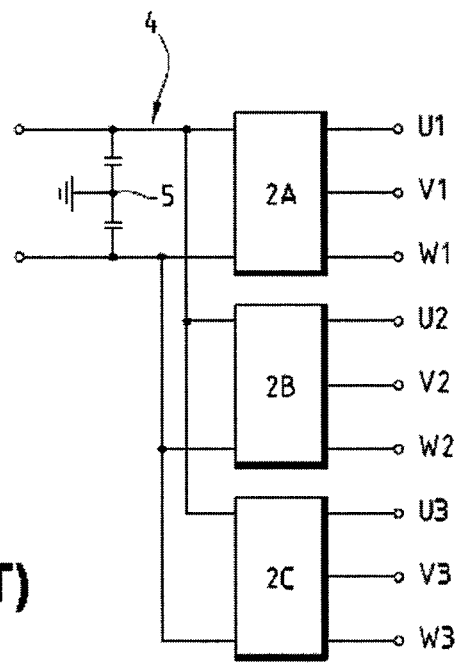
FIG.1
(PRIOR ART)
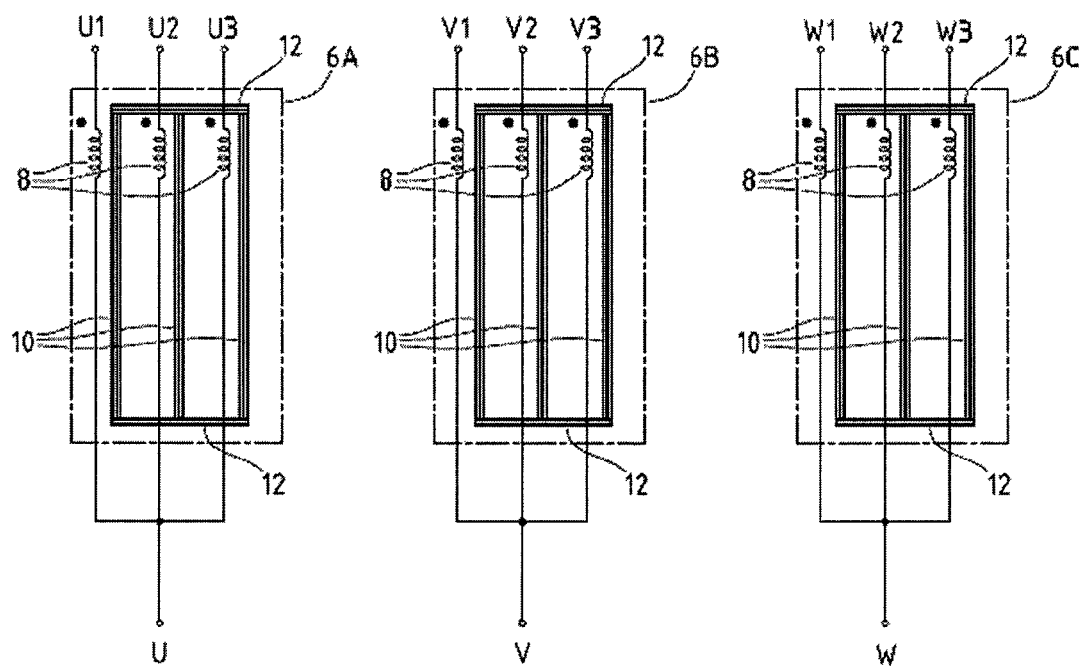

SYSTEM FOR CONVERTING AT LEAST ONE ELECTRICAL INPUT DIRECT CURRENT INTO AN ELECTRICAL POLYPHASE OUTPUT ALTERNATING CURRENT

This claims the benefit of French Patent Application No. 08 59062, filed on Dec. 24, 2008 and hereby incorporated by reference herein.

The present invention relates to a system for converting at least one electrical input direct current into an electrical output alternating current comprising a plurality M of phases and supplied to M output terminals, each output terminal corresponding to one phase of the output current.

The invention also relates to a module for converting an electrical input direct current which is supplied at two input terminals into an electrical output alternating current comprising a plurality M of phases and supplied to M output terminals, each output terminal corresponding to one phase of the output current.

The invention also relates to a conversion system, which is equipped with multiple conversion modules connected in parallel with each other.

The invention also relates to electrical power equipment which is equipped with at least one such conversion system.

BACKGROUND OF THE INVENTION

A conversion system is known from the document U.S. Pat. No. 6,169,677. The object of such a conversion system is to make it possible to connect in parallel a plurality N of identical polyphase voltage inverters, with interleaving of the pulses, in such a way as to improve the waveform of the output voltage, putting in parallel the N inverters making it possible to obtain an output voltage of a higher power. FIG. 1 shows such a conversion system.

It is specified that two points marked by the same letter in FIG. 1 and in the other figures described below are, by convention, connected to each other by an electrical link, which is not shown to make the diagram easier to read.

FIG. 1 shows three three-phase inverters 2A, 2B, 2C, which are connected in parallel with a single bus 4 for circulation of an electrical input direct current. The input bus 4 includes a capacitive mid-point 5, which is connected to electrical earth. Each inverter 2A, 2B, 2C is suitable for converting the input direct current into an intermediate three-phase current, which is supplied to three intermediate terminals Ui, Vi, Wi, where i equals 1, 2 or 3 respectively, corresponding respectively to the inverters 2A, 2B, 2C. Each intermediate terminal Ui, Vi, Wi corresponds to a respective phase of the intermediate three-phase current. The conversion system also comprises three magnetic couplers 6A, 6B, 6C, each being arranged at the output of a respective inverter 2A, 2B, 2C. Each of the three magnetic couplers 6A, 6B, 6C comprises three electromagnetic coupling coils 8, all identical. Each coupling coil 8 is wound around a respective core 10, the three cores 10 of a magnetic coupler 6A, 6B, 6C being connected to each other by magnetic linking bars 12. A core 10 which is equipped with a coupling coil 8 forms a coiled column.

The three coupling coils 8 of the first magnetic coupler 6A are each connected by one of their ends to a respective intermediate terminal U1, U2, U3, the intermediate terminals U1, U2, U3 corresponding to the first phase of each three-phase inverter 2A, 2B, 2C, and by their other end to a single output terminal U, corresponding to the first phase of the three-phase output current.

Similarly, the three coupling coils 8 of the second magnetic coupler 6B are each connected by one of their ends to a respective intermediate terminal V1, V2, V3, and by their other end to a single output terminal V, corresponding to the second phase of the three-phase output current. Similarly, the three coupling coils 8 of the third magnetic coupler 6C are each connected by one of their ends to a respective intermediate terminal W1, W2, W3, and by their other end to a single output terminal W, corresponding to the third phase of the three-phase output current.

In conversion systems of this type (FIG. 1 Prior Art), the number of coiled columns of each magnetic coupler 6A, 6B, 6C equals the number of inverters 2A, 2B, 2C in parallel.

However, conversion systems of this type are not modular, since adding an inverter, in parallel with the other inverters which are already present, makes it necessary to add a magnetic core equipped with a coupling coil in each magnetic coupler. Also, conversion systems of this type generate relatively large line voltage drops.

SUMMARY OF THE INVENTION

An object of the present invention is to propose a modular conversion system, in order to make it easier to add an inverter in parallel, and making it possible to obtain a lower common mode inductance between the phases of the various inverters, in order to reduce the generated line voltage drops.

The present invention accordingly provides a conversion system characterized in that it comprises N×M second electromagnetic coupling coils, each being connected by one of its ends to the other end of a respective first coupling coil and wound around a core distinct from that of the respective first coil, in that a first coupling coil and a second coupling coil are wound around each core, in that the first and second coils of a same core correspond to a same phase of each intermediate alternating current, and in that the first and second electromagnetic coils respectively are intended to be passed through by a respective common mode current, and arranged in such a way that for each magnetic core, the common mode flux generated by the first coil is of the opposite direction to the common mode flux generated by the second coil, each output terminal of the system being connected to the other ends of the M second coils corresponding to a single phase of the intermediate alternating currents.

A first coupling coil, through which an intermediate current circulates, is wound around a core and connected to a second coupling coil, which is wound around another core. The other core also includes another first coil, through which another intermediate current circulates, in such a way that the respective common mode fluxes of each coil of this other core interact with each other. The other first coil and the second coil, which are wound around the other core, correspond to a same phase of each intermediate alternating current, in such a way that the respective common mode fluxes of each coil are in phase.

Combination of the first and second electromagnetic coupling coils for each phase of the output current thus makes it possible to reduce the common mode current between the different phases of the output current. In fact, the common mode fluxes generated respectively by the first coil and second coil of a single core are in phase and of opposite directions, so that they cancel each other out partially. The line voltage drops in common mode are thus greatly reduced. Additionally, this reduction of the line voltage drops is obtained without increasing the inductance, and thus overall dimensions, of the first and second coupling coils.

The magnetic components of the conversion system according to the invention make it possible to obtain, simultaneously, low common mode inductance (low voltage drop) and high differential mode inductance (inductance limiting the circulating currents).

Comparison with a conventional conversion system, for the same number of turns, same size of conductors and same cross-section of each core, shows that the conversion system according to the invention makes it possible to reduce the generated line voltage drops.

According to other embodiments, the conversion system may include one or more of the following characteristics, taken in isolation or according to all technically possible combinations:

the first and second electromagnetic coils are all wound in a same respective direction around their core;

the first coils and the second coils are all identical, and have the same number of turns. When the first coil and the second coil of a same magnetic core are also identical, and have the same number of turns, the common mode fluxes generated respectively by the first coil and second coil are approximately equal in absolute value, and cancel each other out almost completely, since they are in phase and of opposite directions. The line voltage drops in common mode are therefore reduced to an even greater extent.

the magnetic cores are all identical, and have the same reluctance value;

the system comprises, for each inverter, a magnetic coupler including the M magnetic cores associated with a respective inverter, and equipped with the M first coupling coils and M second coupling coils, and the M magnetic cores of each magnetic coupler are connected to each other by magnetic linking bars;

the system includes N distinct buses for circulating an input direct current, each bus being associated with a respective inverter;

the system includes a single bus for circulating the input direct current, common to the N polyphase inverters;

each magnetic coupler also includes at least one return magnetic column, which is connected by the magnetic linking bars to the M magnetic cores of the coupler.

Adding a return magnetic column to each magnetic coupler makes it possible to reduce the homopolar current for each phase of the output current. This is achievable both in the case of a single input bus which is common to all the inverters, and in the case of a distinct input bus for each inverter. However, in the case of a distinct input bus for each inverter, it will be more advantageous, for reasons of cost and overall dimensions, to connect a line resistor of high value between the capacitive mid-point of each bus and the electrical earth.

The magnetic components of the conversion system according to the invention thus make it possible to obtain a homopolar inductance (impedance) of high value, to reduce the homopolar mode currents.

each second electromagnetic coupling coil of a magnetic coupler is connected to the corresponding first electromagnetic coupling coil of the following magnetic coupler, each second electromagnetic coupling coil of the last magnetic coupler being connected to the corresponding first electromagnetic coupling coil of the first magnetic coupler;

the first and second electromagnetic coils corresponding to a same core are wound concentrically around said core;

the first and second electromagnetic coils which are wound around a same core are arranged in succession along said core.

The invention also provides a conversion module characterized in that it comprises:

a single polyphase inverter, which is suitable for connection, via the two input terminals, to a bus for circulating an electrical input direct current, and for converting the input direct current into an intermediate alternating current comprising M phases and supplied to M intermediate terminals, each intermediate terminal corresponding to one phase of the intermediate current;

M first electromagnetic coupling coils, each being connected by one of its ends to a respective terminal of the M intermediate terminals of the polyphase inverter, and by the other of its ends to a first coupling terminal;

M second electromagnetic coupling coils, each being connected by one of its ends to a respective terminal of the M output terminals, and by the other of its ends to a second coupling terminal;

M magnetic cores, a first coupling coil and a second coupling coil being wound around each respective core.

According to other embodiments, the conversion module may include one or more of the following characteristics, taken in isolation or according to all technically possible combinations:

the M magnetic cores are connected to each other by magnetic linking bars;

the module also includes at least one return magnetic column, which is connected by the magnetic linking bars to the M magnetic cores;

the module includes a protective cabinet, in which are arranged the polyphase inverter and the M magnetic cores, each equipped with a respective first electromagnetic coupling coil and second electromagnetic coupling coil, and the two input terminals, the M output terminals, the M first coupling terminals and the M second coupling terminals are fixed to the cabinet and accessible from outside the cabinet.

Another subject-matter of the invention is a system for converting at least one electrical input direct current into an electrical output alternating current, comprising a plurality M of phases and supplied to M output terminals, each output terminal corresponding to a phase of the output current, characterized in that it comprises a plurality N of conversion modules as defined above, in that the N conversion modules are connected in parallel with each other, the N output terminals of each respective module corresponding to a same phase of the output current being connected to each other, and in that each first coupling terminal of a conversion module is connected to a second coupling terminal of another conversion module by an electrical cable, in such a way that the associated first and second coupling coils correspond to a same phase of each intermediate alternating current, and in that the first and second electromagnetic coils respectively are intended to be passed through by a respective common mode current, and arranged in such a way that for each magnetic core, the common mode flux generated by the first coil is of the opposite direction to the common mode flux generated by the second coil.

The present invention also provides electrical power equipment, characterized in that it includes at least one conversion system as defined above.

BRIEF DESCRIPTION OF THE DRAWINGS

The invention and its advantages will appear more clearly on reading the following description, which is given only as an example, and refers to the attached drawings, of which:

FIG. 1, described above, is a diagram of a conversion system of known type,

DETAILED DESCRIPTION OF THE PREFERRED EMBODIMENTS

It should be remembered that, in the rest of the description, two points marked by the same letter in a figure are, by convention, connected to each other by an electrical link, which is not shown to make the diagram easier to read.

Figure 2:
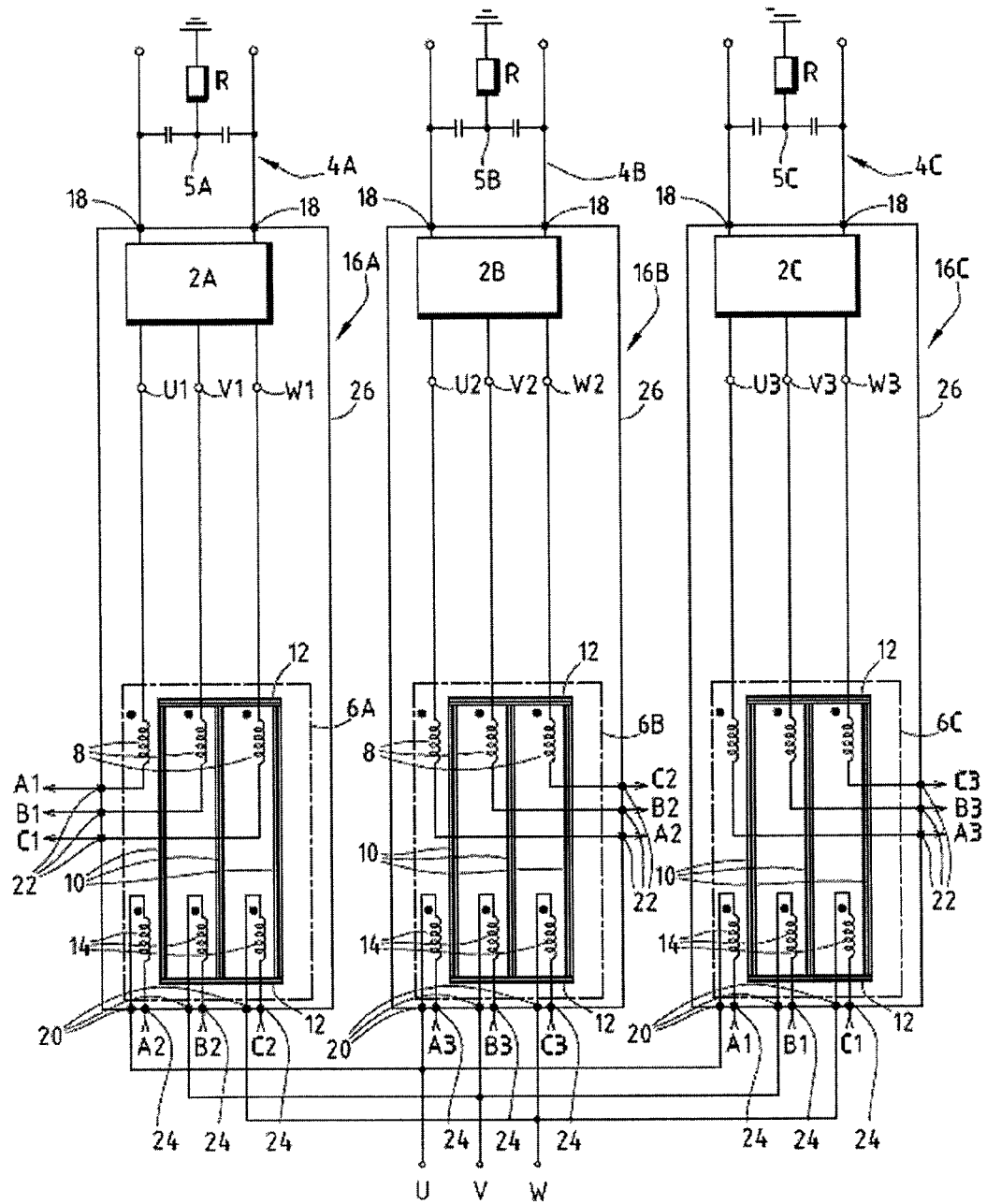
FIG. 2 is a diagram of a conversion system equipped with three conversion modules according to a first embodiment of the invention.

Referring to FIG. 2, it can be seen that the conversion system of the invention comprises, firstly, the same components as those of FIG. 1, i.e. three three-phase inverters 2A, 2B, 2C arranged in parallel with each other, and three magnetic couplers 6A, 6B, 6C each including three first electromagnetic coupling coils 8. Each first electromagnetic coupling coil 8 is wound around a respective core 10, the cores 10 of a single magnetic coupler 6A, 6B, 6C being connected to each other by magnetic linking bars 12.

In the embodiment of FIG. 2, the cores 10 and magnetic linking bars 12 of a same magnetic coupler 6A, 6B, 6C are approximately coplanar. The cores 10 are approximately parallel to each other, and the magnetic linking bars 12 are approximately perpendicular to the cores 10.

It can also be seen in FIG. 2 that each three-phase inverter 2A, 2B, 2C is connected to a respective bus 4A, 4B, 4C for circulating an electrical input direct current. The three input buses 4A, 4B, 4C are distinct from each other. Each input bus includes a capacitive mid-point 5A, 5B, 5C, which is connected via a line resistance R to electrical earth. The line resistance R is, for example, identical and of high value for each of the input buses 4A, 4B, 4C.

Each three-phase inverter 2A, 2B, 2C is suitable for converting the input direct current which circulates on its associated input bus 4A, 4B, 4C into an intermediate three-phase current which is supplied to three intermediate terminals. The intermediate terminals at the output of a first three-phase inverter 2A are U1, V1 and W1. Similarly, the three intermediate terminals at the output of a second three-phase inverter 2B, and at the output of a third three-phase inverter 2C, are U2, V2 and W2 and U3, V3 and W3 respectively.

Each of the first coupling coils 8 of a first magnetic coupler 6A is connected by one of its ends to a respective intermediate terminal U1, V1, W1 of the first three-phase inverter 2A. Similarly, each of the three coupling coils 8 of the second magnetic coupler 6B is connected by one of its ends to a respective intermediate terminal U2, V2, W2 of a second three-phase inverter 2B. Similarly, each of the three coupling coils 8 of a third and last magnetic coupler 6C is connected by one of its ends to a respective intermediate terminal U3, V3, W3 of the third three-phase inverter 2C.

It can also be seen in FIG. 2 that the conversion system of the invention also includes, for each magnetic coupler 6A, 6B, 6C, three second electromagnetic coupling coils 14 which are wound around a respective magnetic core 10. The second coupling coils 14 are all identical to the first coupling coils 8.

In FIG. 2, the conversion system of the invention also includes three modules 16A, 16B, 16C for converting an input direct current into a three-phase output current. A first module 16A comprises the first inverter 2A and the associated first magnetic coupler 6A. Similarly, a second module 16B comprises the second inverter 2B and the associated second magnetic coupler 6B, and a third module 16C comprises the third inverter 2C and the associated third magnetic coupler 6C.

Each module 16A, 16B, 16C includes two input terminals 18, three output terminals 20, three first coupling terminals 22 and three second coupling terminals 24. Each of the three output terminals 20 corresponds to a respective phase of the output current.

More precisely, each module 16A, 16B, 16C includes a protective cabinet 26, in which the polyphase inverter 2A, 2B, 2C and the associated magnetic coupler 6A, 6B, 6C are arranged. The two input terminals 18, the 3 output terminals 20, the 3 first coupling terminals 22 and the three second coupling terminals 24 are fixed to the cabinet 26, and accessible from outside the cabinet.

Each first coupling coil 8 is connected by the other of its ends to a respective first coupling terminal 22. Each second coupling coil 14 is connected by one of its ends to a respective output terminal 20, and by the other of its ends to a respective second coupling terminal 24.

Each first coupling terminal 22 of a conversion module 16A, 16B, 16C is intended to be connected to a second coupling terminal 24 of another conversion module 16A, 16B, 16C by an electrical cable, in such a way that the associated first and second coupling coils 8, 14 correspond to a same phase of each intermediate alternating current.

More precisely, each second electromagnetic coupling coil 14 of the first magnetic coupler 6A is connected by one of its ends to the other end of a respective first coupling coil 8 of the second magnetic coupler 6B, as indicated by the linkage points A2, B2, C2. Similarly, each second coupling coil 14 of the second magnetic coupler 6B is connected by one of its ends to the other end of a respective first coupling coil 8 of the third magnetic coupler 6C, as indicated by the linkage points A3, B3, C3. Similarly, each second coupling coil 14 of the third magnetic coupler 6C is connected by one of its ends to the other end of a respective first coupling coil 8 of the first magnetic coupler 6A, as indicated by the linkage points A1, B1, C1.

Each second coupling coil 14 is thus wound around a distinct magnetic core 10 from that of the first coupling coil 8, to which it is connected. The core of the first coupling coil 8 and the core of the second coupling coil 14 correspond to a same phase of each intermediate three-phase current.

The conversion system includes three output terminals U, V and W, each intended to supply one phase of the three-phase output current. Each output terminal U, V, W is connected to the respective output terminals 20 of each conversion module, corresponding to a same phase of the intermediate alternating currents.

For each core 10, the first coupling coil 8 and the second coupling coil 14 correspond to a same phase of the three-phase output current. In other words, the currents which are intended to pass through the first coil 8 and second coil 14 respectively of a same core 10 are in phase.

The first coupling coils 8 are all wound in the same first direction, and the second coupling coils 14 are all wound in the same second direction. In the embodiment of FIG. 2, the first direction and second direction are the same.

The first coils 8 and second coils 14 are arranged in such a way that the respective fluxes on each core 10, which are intended to be generated by suitable currents to pass through the coils 8, 14, are of opposite directions, as indicated by the dots shown near the coils 8, 14.

In the embodiment of FIG. 2, the first and second electromagnetic coils 8, 14, which are wound around a same core 10, are arranged in succession along said core 10.

The functioning of the conversion system will now be described using FIGS. 2 to 5.

The magnetic couplers 6A, 6B, 6C are characterized by three electrical parameters: a differential mode inductance, a common mode inductance and a homopolar mode inductance.

The differential mode inductance makes it possible to limit the currents which are liable to circulate between the same phase of the different inverters 2A, 2B, 2C in parallel with each other. For example, the differential mode inductances Ldif_U1, Ldif_U2 and Ldif_U3, shown in FIG. 3, make it possible to limit the currents which are liable to circulate between the phases corresponding to the intermediate terminals U1, U2 and U3.

In fact, for the first magnetic core 10 of the first magnetic coupler 6A, the first coupling coil 8 is passed through by a current $I_{U1}$, and the second coupling coil 14 is passed through by a current $I_{U2}$ corresponding to the first phase of the second inverter 2B. Any instantaneous difference $I_{dU1}$ between the currents $I_{U1}$ and $I_{U2}$ creates a magnetic flux $\Phi_{dU1}$ in this column.

$$I_{dU1} = I_{U1} - I_{U2} \quad (I)$$

$$\Phi_{dU1} = \frac{2xNbS}{R_{core}} \times I_{dU1} \quad (II)$$

where NbS represents the number of turns of a coupling coil 8, 14, and $R_{core}$ represents the total reluctance of a magnetic core 10.

The flux equation $\Phi_{dU1}$ can also be written in the form:

$$\Phi_{dU1} = \frac{Ldif\_U1}{2xNbS} \times I_{dU1} \quad (III)$$

Analogously, for the first magnetic core 10 of the second magnetic coupler 6B, the first coupling coil 8 is passed through by the current $I_{U2}$, and the second coupling coil 14 is passed through by a current $I_{U3}$. An instantaneous difference $I_{dU2}$ between the currents $I_{U2}$ and $I_{U3}$ is then written in the form:

$$I_{dU2} = I_{U2} - I_{U3} \quad (IV)$$

and the magnetic flux $\Phi_{dU2}$ which is created in this magnetic core 10 is written in the form:

$$\Phi_{dU2} = \frac{Ldif\_U2}{2xNbS} \times I_{dU2} = \frac{2xNbS}{R_{core}} \times I_{dU2} \quad (V)$$

Analogously again, for the first magnetic core 10 of the third magnetic coupler 6C, the first coupling coil 8 is passed through by the current $I_{U3}$, and the second coupling coil 14 is passed through by the current $I_{U1}$. An instantaneous difference $I_{dU3}$ between the currents $I_{U3}$ et $I_{U1}$ is written in the form:

$$I_{dU3} = I_{U3} - I_{U1} \quad (IV)$$

and the magnetic flux $\Phi_{dU3}$ which is created in this first magnetic core 10 of the third coupler 6C is written in the form:

$$\Phi_{dU3} = \frac{Ldif\_U3}{2xNbS} \times I_{dU3} = \frac{2xNbS}{R_{core}} \times I_{dU3} \quad (VII)$$

The differential mode inductances Ldif_U1, Ldif_U2 and Ldif_U3 are deduced from the equations (II), (III), (V) and (VII) and written in the form:

$$Ldif\_U1 = Ldif\_U2 = Ldif\_U3 = \frac{(2xNbS)^2}{R_{core}} \quad (VIII)$$

The differential mode inductances Ldif_V1, Ldif_V2 and Ldif_V3, Ldif_W1, Ldif_W2 and Ldif_W3 correspond respectively to the second and third magnetic cores of each of the magnetic couplers 6A, 6B, 6C, and the corresponding magnetic fluxes which are created in these magnetic cores 10 are determined analogously. The differential mode inductances Ldif_V1, Ldif_V2 and Ldif_V3, Ldif_W1, Ldif_W2 and Ldif_W3 are written in the form:

$$Ldif\_V1 = Ldif\_V2 \quad (IX)$$
$$= Ldif\_V3$$
$$= Ldif\_W1$$
$$= Ldif\_W2$$
$$= Ldif\_W3$$
$$= \frac{(2xNbS)^2}{R_{core}}$$

It should be noticed here that the differential mode inductances are principally determined by the total reluctance $R_{core}$ of a coiled magnetic core 10.

Figure 3:
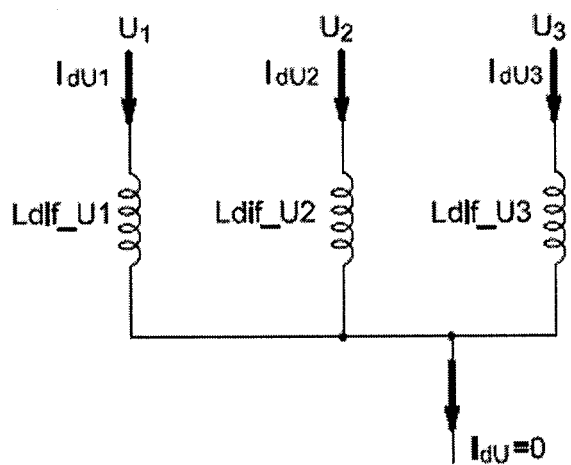
FIG. 3 is an electrical diagram of an equivalent circuit in differential mode of the first phases of three-phase inverters in parallel of the conversion system of FIG. 2.

In the embodiment of FIGS. 2 and 3, all the differential mode inductances are equal, since all the coils 8, 14 have the same number NbS of turns, and all the magnetic cores 10 are identical and have the same total reluctance $R_{core}$.

To obtain the best electrical performances, each differential mode inductance will be chosen with as great a value as possible, while looking for a compromise between the electrical performance and the overall dimensions of each magnetic coupler 6A, 6B, 6C.

It should be noted that the sum $I_{dU}$ of the instantaneous differences $I_{dU1}$, $I_{dU2}$ and $I_{dU3}$ is zero according to equations (I), (IV) and (VI):

$$I_{dU} = I_{dU1} + I_{dU2} + I_{dU3} = 0 \quad (X)$$

Figure 4:
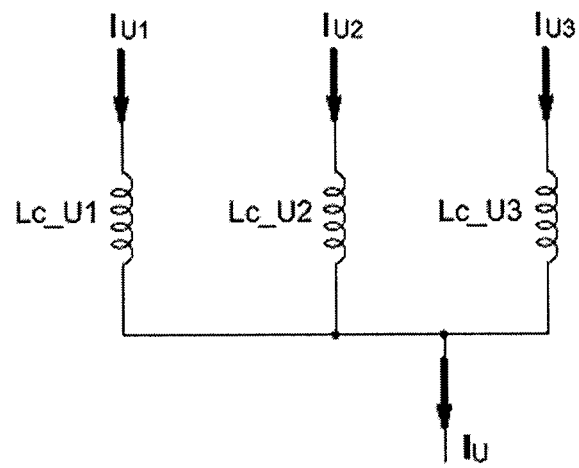
FIG. 4 is an electrical diagram analogous to that of FIG. 3 in common mode.

In FIG. 4, which shows a common mode equivalent circuit for the phases corresponding to the terminals U1, U2 and U3, common mode inductances Lc_U1, Lc_U2 and Lc_U3 are suitable for reducing the current undulations to three times the quench frequency. In a more general case, where N inverters are arranged in parallel with each other, the common mode inductances Lc_U1 to Lc_UN are suitable for reducing the current undulations to N times the quench frequency.

Analogously, common mode inductances Lc_V1, Lc_V2 and Lc_V3, and Lc_W1, Lc_W2 and Lc_W3, are suitable for reducing the undulations of the currents circulating in the terminals V1, V2 and V3 and W1, W2 and W3 respectively.

Each common mode inductance Lc_U1 to Lc_U3, Lc_V1 to Lc_V3 and Lc_W1 to Lc_W3 is principally determined by the leakage fluxes associated with each respective coupling coil 8, 14 of the corresponding magnetic coupler 6A, 6B, 6C.

The first coil 8 and second coil 14 of the same core 10 are passed through by the same phase of the respective intermediate currents. The first coil 8 and second coil 14 of the same core 10 are also arranged in such a way that the leakage flux generated by the first coil 8, which is passed through by a first common mode current, is of the opposite direction to the leakage flux generated by the second coil 14, which is passed through by a second common mode current. The coils 8, 14 being identical, and the common mode currents being of approximately equal amperage, the leakage fluxes generated by the first coil 8 and second coil 14 are approximately equal in absolute value. The leakage fluxes generated by the first coil 8 and second coil 14 are therefore in phase, of opposite directions and approximately equal in absolute value, so that they cancel each other out almost completely.

The common mode inductances Lc_U1 to Lc_U3, Lc_V1 to Lc_V3 and Lc_W1 to Lc_W3 are therefore of low value, and the voltage drop at the terminals of the load (not shown), which is connected to the terminals U, V and W of the conversion system, is thus greatly reduced.

Figure 5:
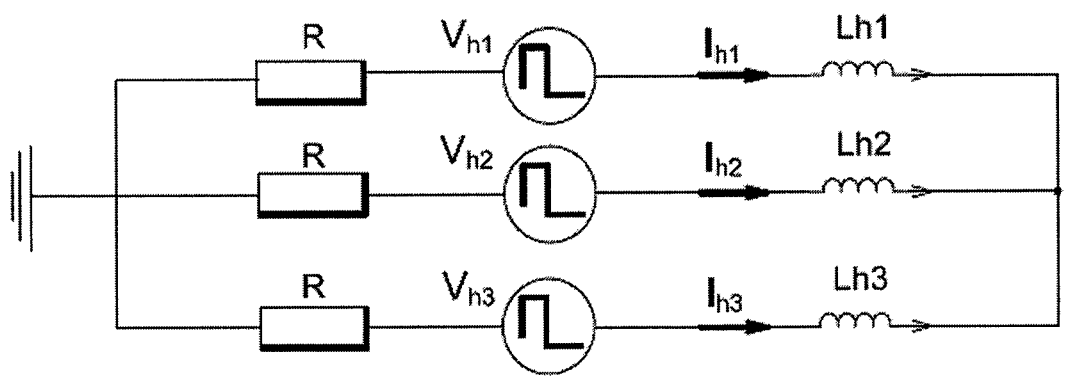
FIG. 5 is an electrical diagram of an equivalent circuit in homopolar mode of the conversion system of FIG. 2.

In FIG. 5, which shows a homopolar mode equivalent circuit of the conversion system, homopolar inductances Lh1, Lh2 and Lh3 are suitable for reducing the respective homopolar currents $I_{h1}$, $I_{h2}$ and $I_{h3}$. In homopolar mode, the first inverter 2A, second inverter 2B, third inverter 2C can be represented by a homopolar voltage generator which supplies a voltage Vh1, Vh2, Vh3 respectively. Each homopolar voltage of an inverter 2A, 2B, 2C is thus defined by the following formula:

$$V_{hj} = \frac{V_{Uj} + V_{Vj} + V_{Wj}}{3}, j = 1, 2 \text{ or } 3 \tag{XI}$$

where j equals 1, 2, 3 respectively, and $V_{Uj}$ is the phase voltage corresponding to the intermediate terminal Uj, $V_{Vj}$ is the phase voltage corresponding to the intermediate terminal Vj, and $V_{Wj}$ is the phase voltage corresponding to the intermediate terminal Wj.

The line resistance R being connected for each respective bus 4A, 4B, 4C at its capacitive mid-point 5A, 5B, 5C and the electrical earth, upstream from each inverter 2A, 2B, 2C, the homopolar mode equivalent circuit includes this resistance R for each line corresponding to a respective inverter 2A, 2B, 2C, and upstream from each homopolar voltage generator.

Each homopolar mode inductance Lh1, Lh2, Lh3 depends on the reluctance of the air at the exterior of the corresponding magnetic core 10. Since this reluctance is very large, the homopolar mode inductances Lh1, Lh2 and Lh3 have low values.

Since each line resistance R has a very high value, the homopolar currents $I_{h1}$, $I_{h2}$ and $I_{h3}$ have low values, although the homopolar mode inductances Lh1, Lh2 and Lh3 have low values.

Thus the particular association, described above, of the first and second electromagnetic coupling coils 8, 14 for each phase of the three-phase output current makes it possible to reduce the common mode current which is liable to circulate between the phases of the different inverters, while reducing the value of the inductance of the electromagnetic coupling coils 8, 14, to reduce the generated line voltage drops. The homopolar mode currents which circulate in the conversion system also have low values, because of the presence of a line resistance R of high value for each input bus 4A, 4B, 4C. The inductance value which is chosen for the electromagnetic coupling coils 8, 14 makes it possible to obtain a limited differential mode current between the different phases. The conversion system according to the invention thus makes it possible to obtain very good electrical performances.

Figure 6:
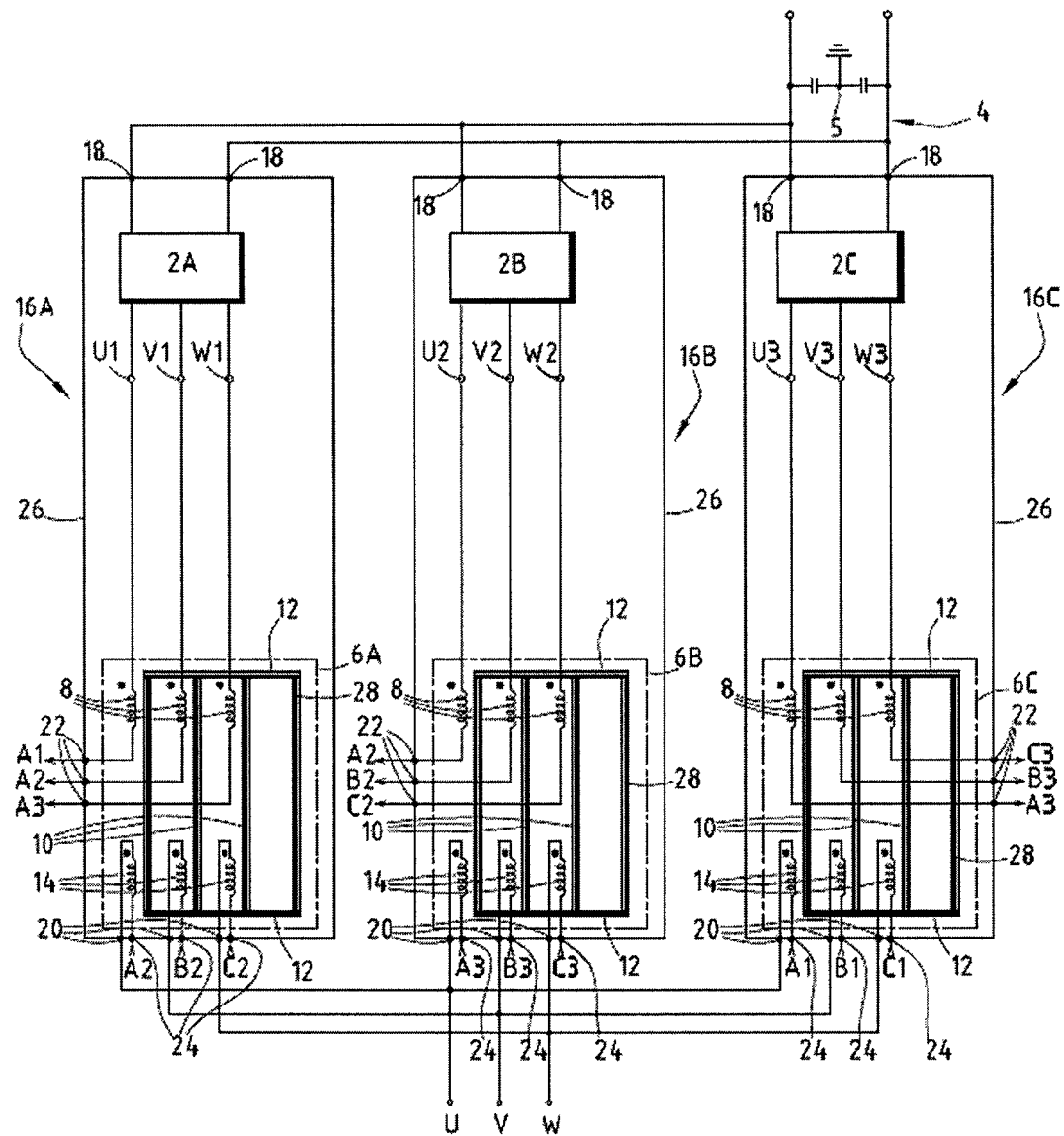
FIG. 6 is an diagram analogous to that of FIG. 2 according to a second embodiment of the invention.

FIG. 6 shows a second embodiment of the invention, for which analogous elements to the first embodiment described above are marked by identical references, and are therefore not described again.

According to the second embodiment, the three three-phase inverters 2A, 2B and 2C are connected to a single bus 4 for circulating the input current. In other words, the three-phase inverters 2A, 2B, 2C are connected in parallel with the common input bus 4. The input bus 4 includes a capacitive mid-point 5, which is connected to electrical earth.

It can be seen in FIG. 6 that each magnetic coupler 6A, 6B, 6C also includes, according to the second embodiment of the invention, a return magnetic column 28 which is connected by the magnetic linking bars 12 to the three corresponding magnetic cores 10. The return magnetic column 28 is intended to reduce the homopolar current for each respective phase of the output current. Each magnetic coupler 6A, 6B, 6C does not include a coil wound around the respective return magnetic column 28.

In the embodiment of FIG. 6, the cores 10, magnetic linking bars 12 and return magnetic column 28 of a single magnetic coupler 6A, 6B, 6C are approximately coplanar. The cores 10 and return magnetic column 28 are approximately parallel to each other, and the magnetic linking bars 12 are approximately perpendicular to the cores 10 and the return magnetic column 28.

The functioning of this second embodiment is similar to that of the first embodiment. In particular, the functioning in differential mode and the functioning in common mode of the second embodiment are identical to those of the first embodiment, and are therefore not described again.

The functioning in homopolar mode of this second embodiment will now be described using FIG. 7.

Figure 7:
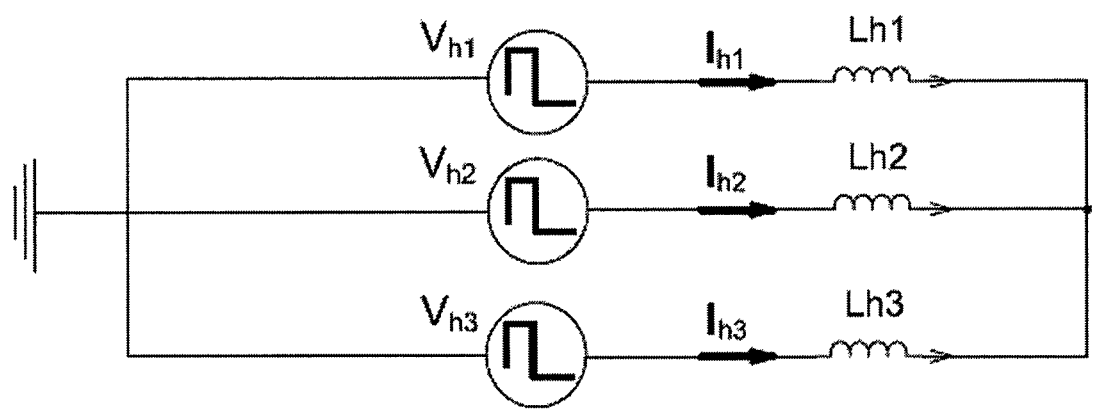
FIG. 7 is an electrical diagram analogous to that of FIG. 5 according to the second embodiment of the invention.

It can be seen in FIG. 7 that the homopolar mode equivalent circuit of the conversion system according to the second embodiment does not include a line resistance for each three-phase inverter, 2A, 2B, 2C. In fact, the three-phase inverters 2A, 2B, 2C are all connected in parallel to the same input bus 4, of which the capacitive mid-point 5 is directly connected to electrical earth. In the embodiment of FIG. 6, each three-phase inverter 2A, 2B, 2C cannot be equipped with a distinct line resistance upstream from its input. It is then necessary that the homopolar mode inductances Lh1, Lh2 and Lh3 have high values, so that each respective homopolar current $I_{h1}$, $I_{h2}$ and $I_{h3}$ has a low value.

Adding a return magnetic core 16 to each of the magnetic couplers 6A, 6B, 6C according to the second embodiment of the invention makes it possible to obtain homopolar inductances Lh1, Lh2 et Lh3 of large values. In fact, the magnetic flux $\Phi_{Rj}$ which circulates through the return core 16 of the $j^{th}$ magnetic coupler is written in the form:

$$\Phi_{Rj} = \frac{(2xNbS)xI_{hj}}{3x(3xR_{return} + R_{core})} \quad \text{(XII)}$$

where j varies respectively from 1 to 3, and $R_{return}$ represents the total reluctance of the return magnetic column 28. The flux $\Phi_{Rj}$ can also be written in the form:

$$\Phi_{Rj} = \frac{L_{hj}}{2xNbS} \times I_{hj} \quad \text{(XIII)}$$

The homopolar mode inductance Lhj is deduced from the equations (XII) and (XIII), and is written in the form:

$$L_{hj} = \frac{(2xNbS)^2}{3x(3xR_{return} + R_{core})} \quad \text{(XIV)}$$

Adding such a return magnetic column 28 thus makes it possible to control the value of the homopolar inductance Lhj via the magnetic flux $\Phi_{Rj}$ which circulates through the return column 28. The homopolar inductance Lhj depends on the total reluctance $R_{return}$ of the return magnetic column 28, and on the total reluctance $R_{core}$ of each coiled magnetic core 10.

The return magnetic column 28 and each coiled magnetic core 10 are chosen with a low total reluctance value $R_{return}$, $R_{core}$ respectively, making it possible to obtain a high value for the homopolar inductance Lhj, which thus results in a low homopolar current $I_{hj}$.

The advantages of this second embodiment are identical to those of the first embodiment, and are therefore not described again.

As a variant, the first and second electromagnetic coils 8, 14 corresponding to a single core 10 are wound concentrically around said magnetic core 10.

As a variant, the first and second electromagnetic coils 8, 14 are different, and have distinct numbers of turns.

As a variant, each magnetic coupler 6A, 6B, 6C includes at least two return magnetic columns 28. The return magnetic columns 28 are, for example, arranged symmetrically, on one side and the other of the magnetic cores 10 of the coupler.

As a variant, each input bus 4A, 4B, 4C has a line resistance $R_A$, $R_B$, $R_C$, the resistances $R_A$, $R_B$, $R_C$ being of distinct respective values.

As a variant, the cores 10 are distributed on the circumference of an imaginary cylinder, the angle at the centre between two successive cores 10 being equal to $2\times\pi/M$, where M is the number of cores 10 of each magnetic coupler. Each core has an upper end and a lower end. The upper ends of the cores 10 are connected to each other via upper magnetic linking bars 12, and the lower ends of the cores 10 are connected to each other via lower magnetic linking bars 12. Each linking bar has one end for linking to a core 10, and one end which is remote from said core 10. Each remote end of the linking bars 12 is machined in the form of a point, the angle at the top of the point being equal to $2\times\pi/M$ degrees. Each remote end of the upper and lower linking bars 12 is fixed to the (M−1) other remote ends of the upper and lower linking bars 12 respectively. The meeting of the upper and lower magnetic linking bars 12 is approximately coplanar, and in the form of a star. As in the previous embodiments, the coils 8, 14 are wound around the cores 10.

When the magnetic coupler 6A, 6B, 6C includes a return magnetic column 28, the return magnetic column 28 is arranged approximately parallel to the cores 10. More precisely, the return column 28 connects the union of the remote ends of the upper linking bars 12 to the union of the remote ends of the lower linking bars 12. The return column 28 has an air gap in its central part, and includes an upper element and a lower element, which are separated by the air gap and approximately identical. The return column 28 does not include a coil.

The person skilled in the art will understand that the invention, which is described in the above embodiments for three three-phase inverters, applies more generally to N polyphase inverters, which are connected in parallel with each other and intended to convert the input direct current into an intermediate alternating current with M phases. In this case, the conversion system comprises N conversion modules, each comprising one polyphase inverter and one associated magnetic coupler. Each of the N conversion modules includes two input terminals 18, M output terminals 20, M first coupling terminals 22 and M second coupling terminals 24. Each of the N magnetic couplers includes M first coupling coils 18, M second coupling coils 14 and M magnetic cores 10. Around each of the M magnetic cores 10 of a magnetic coupler are wound concentrically, or successively, a first coupling coil 8 and a corresponding second coupling coil 14. In the case that the N polyphase inverters are connected to a single common bus 4 for circulating the input direct current, each of the N magnetic couplers includes at least one return column 28.

The person skilled in the art will understand that the invention applies more generally to any form of permutation which makes it possible to connect a second coil of a magnetic coupler to the first coil of another magnetic coupler, the first and second coils corresponding to the same phase of the polyphase output current. The invention is therefore not limited to the connection in the form of a circular permutation which is used to connect the first coils and second coils of the embodiments of FIGS. 2 and 6.

Finally, the person skilled in the art will understand that the conversion system according to the invention is particularly modular. In fact, in the case, for example, of a need for additional electrical power, it is sufficient to add one or more conversion modules to the conversion system according to the invention which was previously implemented. An additional module is added very easily, since it is sufficient to connect it upstream to an input bus via its input terminals 18, then to connect, for example, its first coupling terminals 22 to the second coupling terminals 24 of the preceding module, and to connect its second coupling terminals 24 to the first coupling terminals 22 of the following module. It is understood that if the additional module is in the last position, the following module is the first module, and if the additional module is in the first position, the preceding module is the last module. Finally, the additional module is connected downstream to the output terminals of the system via its output terminals 20.

What is claimed is:

1. A system for converting at least one electrical input direct current into an electrical output alternating current comprising a plurality M of phases and supplied to M output terminals, each output terminal corresponding to one phase of the output current, of the type comprising:

N polyphase inverters, connected in parallel with each other and each connected to a bus for circulation of an electrical input direct current, each inverter being suitable for converting the input direct current into an intermediate alternating current comprising M phases and supplied to M intermediate terminals, each intermediate terminal corresponding to one phase of the intermediate current;

N×M first electromagnetic coupling coils, each being connected by one of its ends to a respective terminal of the M intermediate terminals of one of the N polyphase inverters;

N×M magnetic cores, each first electromagnetic coil being wound around a respective core, wherein it comprises N×M second electromagnetic coupling coils, each being connected by one of its ends to the other end of a respective first coupling coil and wound around a distinct core from that of the respective first coil, in that a first coupling coil and a second coupling coil are wound around each core, in that the first and second coils of a same core correspond to a same phase of each intermediate alternating current, and in that the first and second electromagnetic coils respectively are intended to be passed through by a respective common mode current, and arranged in such a way that for each magnetic core, the common mode flux generated by the first coil is of the opposite direction to the common mode flux generated by the second coil, each output terminal of the system being connected to the other ends of the M second coils corresponding to a same phase of the intermediate alternating currents.

2. The conversion system according to claim 1, wherein the first and second electromagnetic coils are all wound in a same respective direction around their core.

3. The conversion system according to claim 1, wherein the first coils and the second coils are all identical, and have the same number of turns.

4. The conversion system according to claim 1, wherein the magnetic cores are all identical, and have the same reluctance value.

5. The conversion system according to claim 1, wherein it comprises, for each inverter, a magnetic coupler including the M magnetic cores associated with a respective inverter, and equipped with the M first coupling coils and M second coupling coils, and in that the M magnetic cores of each magnetic coupler are connected to each other by magnetic linking bars.

6. The conversion system according to claim 1, wherein it includes N distinct buses for circulating an input direct current, each bus being associated with a respective inverter.

7. The conversion system according to claim 1, wherein it includes a single bus for circulating the input direct current, common to the N polyphase inverters.

8. The conversion system according to claim 5, wherein each magnetic coupler also includes at least one return magnetic column, which is connected by the magnetic linking bars to the M magnetic cores of the coupler.

9. The conversion system according to claim 5, wherein each second electromagnetic coupling coil of a magnetic coupler is connected to the corresponding first electromagnetic coupling coil of the following magnetic coupler, each second electromagnetic coupling coil of the last magnetic coupler being connected to the corresponding first electromagnetic coupling coil of the first magnetic coupler.

10. The conversion system according to claim 1, wherein the first and second electromagnetic coils corresponding to a single core are wound concentrically around said core.

11. The conversion system according to claim 1, wherein first and second electromagnetic coils which are wound around a same core are arranged in succession along said core.

12. A module for converting an electrical input direct current supplied at two input terminals into an electrical output alternating current comprising a plurality M of phases and supplied to M output terminals, each output terminal corresponding to one phase of the output current, wherein the module comprises:

a single polyphase inverter which is suitable for being connected, via the two input terminals, to a bus for circulating an electrical input direct current, and for converting the input direct current into an intermediate alternating current comprising M phases and supplied to M intermediate terminals, each intermediate terminal corresponding to one phase of the intermediate current;

M first electromagnetic coupling coils, each being connected by one end to a respective terminal of the M intermediate terminals of the polyphase inverter, and by another end to a first coupling terminal;

M second electromagnetic coupling coils, each being connected by one end to a respective terminal of the M output terminals, and by another end to a second coupling terminal;

M magnetic cores, a first coupling coil and a second coupling coil being wound around each respective core, and at least one return magnetic column, which is connected by magnetic linking bars to the M magnetic cores.

13. A module for converting an electrical input direct current supplied at two input terminals into an electrical output alternating current comprising a plurality M of phases and supplied to M output terminals, each output terminal corresponding to one phase of the output current, wherein the module comprises:

a single polyphase inverter which is suitable for being connected, via the two input terminals, to a bus for circulating an electrical input direct current, and for converting the input direct current into an intermediate alternating current comprising M phases and supplied to M intermediate terminals, each intermediate terminal corresponding to one phase of the intermediate current;

M first electromagnetic coupling coils, each being connected by one end to a respective terminal of the M intermediate terminals of the polyphase inverter, and by another end to a first coupling terminal;

M second electromagnetic coupling coils, each being connected by one end to a respective terminal of the M output terminals, and by another end to a second coupling terminal;

M magnetic cores, a first coupling coil and a second coupling coil being wound around each respective core, and a protective cabinet, in which are arranged the polyphase inverter and the M magnetic cores, each equipped with a respective first electromagnetic coupling coil and second electromagnetic coupling coil, and in that the two input terminals, the M output terminals, the M first coupling terminals and the M second coupling terminals are fixed to the cabinet and accessible from outside the cabinet.

14. A system for converting at least one electrical input direct current supplied at two input terminals into an electrical output alternating current, comprising a plurality M of phases and supplied to M output terminals, each output terminal corresponding to a phase of the output current, wherein the system comprises:

a plurality N of conversion modules including:
a single polyphase inverter which is suitable for being connected, via the two input terminals, to a bus for circulating the at least one electrical input direct current, and for converting the input direct current into an intermediate alternating current comprising M phases and supplied to M intermediate terminals, each intermediate terminal corresponding to one phase of the intermediate current;

M first electromagnetic coupling coils, each being connected by one end to a respective terminal of the M intermediate terminals of the polyphase inverter, and by another end to a first coupling terminal;

M second electromagnetic coupling coils, each being connected by one end to a respective terminal of the M output terminals, and by another end to a second coupling terminal; and M magnetic cores, a first coupling coil and a second coupling coil being wound around each respective core;

the N conversion modules being connected in parallel with each other, the N output terminals of each respective module corresponding to a same phase of the output current being connected to each other, each first coupling terminal of a conversion module is being connected to a second coupling terminal of another conversion module by an electrical cable, in such a way that the associated first and second coupling coils correspond to a same phase of each intermediate alternating current, and in that the first and second electromagnetic coils respectively are intended to be passed through by a respective common mode current, and arranged in such a way that for each magnetic core, the common mode flux generated by the first coil is of the opposite direction to the common mode flux generated by the second coil.

15. Electrical power equipment, wherein it includes at least one conversion system according to claim 1.

16. Electrical power equipment, wherein it includes at least one conversion system according to claim 14.

* * * * *